No. 787,834. PATENTED APR. 18, 1905.
J. T. CRENSHAW.
NUT LOCK.
APPLICATION FILED AUG. 29, 1903.

Witnesses

Inventor
John T. Crenshaw,
Attorneys

No. 787,834. Patented April 18, 1905.

UNITED STATES PATENT OFFICE.

JOHN THOMAS CRENSHAW, OF DERMOTT, ARKANSAS.

NUT-LOCK.

SPECIFICATION forming part of Letters Patent No. 787,834, dated April 18, 1905.

Application filed August 29, 1903. Serial No. 171,247.

*To all whom it may concern:*

Be it known that I, JOHN THOMAS CRENSHAW, a citizen of the United States, residing at Dermott, in the county of Chicott and State of Arkansas, have invented a new and useful Nut-Lock, of which the following is a specification.

This invention relates generally to nut-locks, and more particularly to one designed for use upon railroad-rails and particularly adapted for use in connection with novel constructions of fish-plate and bolt, the object of the invention being to provide a nut-lock which will securely fasten the nut upon the bolt, said bolt being of such construction as to be securely locked in the fish-plates.

The invention consists also in the novel features of construction and combination of the various parts, all of which will be fully described hereinafter and pointed out in the claims.

Figure 1:
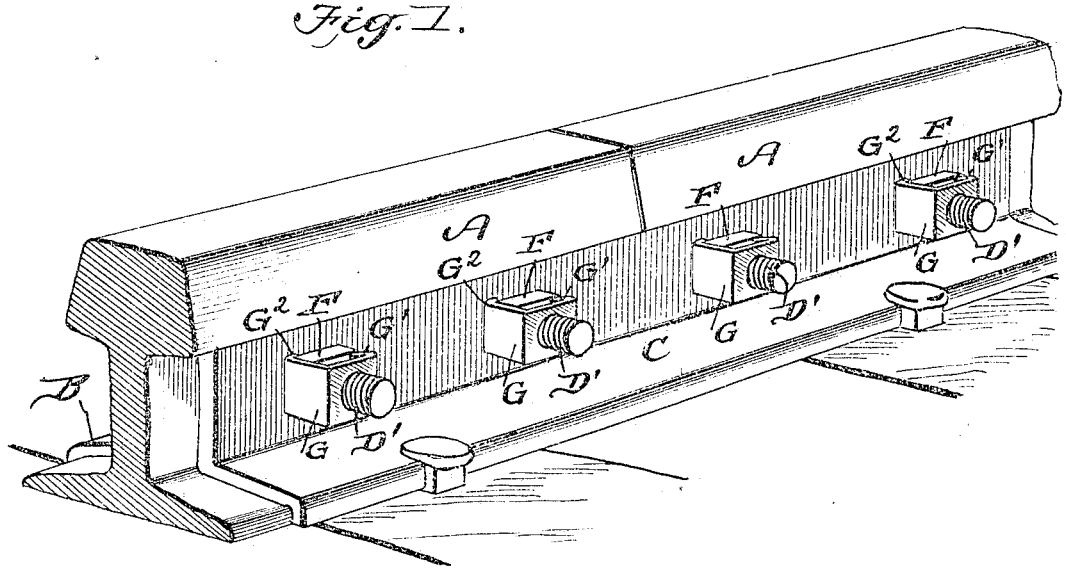
Figure 2:
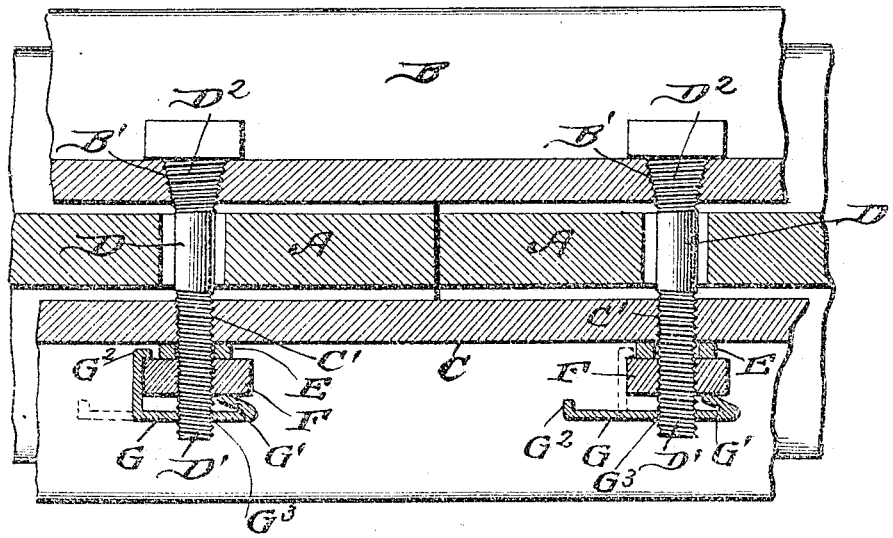
Figure 3:
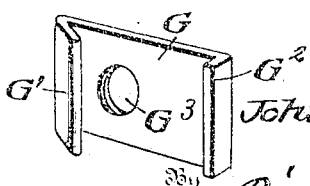

In the drawings forming part of this specification, Figure 1 is a perspective view showing the practical application of my invention. Fig. 2 is a horizontal sectional view taken through the railroad-rail, fish-plates, nuts, and locks, the bolts being shown in elevation. Fig. 3 is a detail perspective view of the lock.

Referring to the drawings, A indicates the meeting ends of two railroad-rails, and B and C the fish-plates arranged upon opposite sides of the joint. The fish-plate B has tapered openings B', while the fish-plate C has threaded openings C' of uniform diameter, the pitch of the thread being substantially the same as the pitch of the thread of the opening B'; but the threads are cut in reverse directions, one being a right-hand thread, while the other is a left-hand thread. The bolt D is threaded at its outer end D', which threaded portion is adapted to engage the threaded aperture C' of the fish-plate C, and adjacent the head of the bolt said bolt is enlarged and made tapered and threaded, as shown at $D^2$, said threaded portion being adapted to engage the threaded opening B'. Any suitable construction of washer E is placed upon the bolt and rests against the fish-plate C, and the ordinary construction of nut F is then screwed firmly upon the threaded end of the bolt, and the locking-plate G is then screwed down until the under-bent end G' engages the top of the nut. The opposite end of the locking-plate is then bent at a right angle and forced against the side of the nut until the rib $G^2$ engages the under side of the nut, thereby securely fastening the lock upon the nut, said locking-plate having a threaded opening $G^3$, so that the said plate can be screwed upon the end of the bolt.

The manner of assembling the parts is as follows: The fish-plates B and C being placed in proper position, the threaded end D' of the bolt D is passed through the threaded opening B' of the fish-plate B, being of smaller diameter than any part of said opening, and is threaded into the opening C' of the fish-plate C. The threads on the part $D^2$ and of the opening B' do not come into immediate engagement, as the outer end portion of the opening B' is of greater diameter than the diameter of the inner end portion of the conical threaded portion $D^2$; but as soon as the bolt reaches a position where the threads of the part $D^2$ will engage those of the opening B' further movement of the bolt is arrested, and owing to the opposite threading of the ends of the bolt it cannot be turned in either direction. As soon as the bolt D is in position the nut F and other parts can be placed in position in the usual manner.

Having thus fully described my invention, what I claim as new, and desire to secure by Letters Patent, is—

1. The combination with fish-plates having reversely-threaded openings, the openings in one fish-plate being tapered, of bolts having oppositely-threaded portions, the threaded portion adjacent the head being tapered, nuts and the locking-plates screwed upon the outer ends of the bolts, each locking-plate having one end bent under and adapted to engage the top of a nut, the opposite end of the plate having a rib adapted to engage the under side of the nut, substantially as described.

2. The combination with the bolt and nut, of a locking-plate having a threaded opening, one end of the plate being bent under and adapted to engage the top of the nut, the opposite end of the plate being provided with a rib adapted to be forced into engagement with the bottom sides of the nut, substantially as described.

JOHN THOMAS CRENSHAW.

Witnesses:
W. K. BAKER,
A. FLESCHNER.